United States Patent [19]

Oba et al.

[11] Patent Number: 5,241,465
[45] Date of Patent: Aug. 31, 1993

[54] METHOD FOR DETERMINING OPTIMUM SCHEDULE IN COMPUTER-AIDED SCHEDULING SYSTEM

[75] Inventors: Michiko Oba, Ikeda; Norihisa Komoda, Kawasaki; Kazuhiro Kawashima, Yokohama; Keiichi Hara, Kawasaki, all of Japan

[73] Assignees: Hitachi Ltd.; Hitachi Microcomputer System Ltd., both of Tokyo, Japan

[21] Appl. No.: 690,820

[22] Filed: Apr. 23, 1991

[30] Foreign Application Priority Data

Apr. 27, 1990 [JP] Japan ................................. 2-113742

[51] Int. Cl.$^5$ ....................... G06F 15/22; G06F 15/20
[52] U.S. Cl. .................................. 364/401; 364/402; 364/408
[58] Field of Search ..................... 364/401, 402, 408; 395/904

[56] References Cited

U.S. PATENT DOCUMENTS 5,111,391 5/1992 Fields et al. ..................... 364/401

OTHER PUBLICATIONS

Michael J. Shaw, "Knowledge-Based Scheduling in Flexible Manufacturing Systems: An Integration of Pattern-Directed Inference and Heuristic Search", International Journal of Production Research, vol. 26, No. 5, 1988, pp. 821-844 (Provided in English).

Primary Examiner—Roy N. Envall, Jr.
Assistant Examiner—Khai Tran
Attorney, Agent, or Firm—Fay, Sharpe, Beall, Fagan, Minnich & McKee

[57] ABSTRACT

In a method for determining an optimum scheduling in a computer-aided scheduling system the data associated with a schedule to be generated is previously stored in a memory data. A strategy decision table showing therein one or more scheduling strategies suitable for a plurality of the states in a scheduling process is prepared. An optimization definition table indicating degree of improvement precedence or precedence order of the scheduling strategies of the evaluation items, where degree of improvement precedence is defined as degree of improvement of evaluation value of he evaluation item in changing of the scheduled strategy, is prepared. A schedule is generated by repetition of selecting and executing the scheduling strategies by using the strategy decision table. The other schedules are generated by changing the scheduling strategy selected in the state of the scheduling process by using the optimization definition table. An optimum schedule having the best evaluation value is selected.

10 Claims, 15 Drawing Sheets

FIG. 4A

STATE MANAGEMENT TABLE 401

| NODE No. | CANDIDATE STRATEGY PRECEDENCE | | | | | NUMBER OF DEVELOPED BRANCHS | DEVELOPED BRANCH No. | | | | PREVIOUS BRANCH No. |
|---|---|---|---|---|---|---|---|---|---|---|---|
| | STRATEGY 1 | STRATEGY 2 | STRATEGY 3 | STRATEGY 4 | STRATEGY 5 | | 1 | 2 | 3 | ... | |
| 0 | 3 | 1 | 0 | 2 | 0 | 1 | 1 | | | ... | -1 |
| 1 | 3 | 0 | 2 | 0 | 1 | 2 | 2 | 5 | | ... | 0 |
| 2 | 2 | 0 | 3 | 1 | 0 | 1 | 3 | | | ... | 1 |
| 3 | 3 | 0 | 1 | 0 | 2 | 1 | 4 | | | ... | 2 |
| 4 | | | | | | | | | | ... | |
| 5 | | | | | | | | | | ... | |

FIG. 4B

DEVELOPED-BRANCH DATA MANAGEMENT TABLE 402

| BRANCH No. | USE STRATEGY No. | ASSIGNMENT JOB No. | ASSIGNMENT RESOURCE No. | SUBSEQUENT NODE No. |
|---|---|---|---|---|
| 1 | 2 | 2 | 1 | 1 |
| 2 | 5 | 1 | 2 | 2 |
| 3 | 4 | 3 | 1 | 3 |
| 4 | 3 | 1 | 3 | NONE |
| 5 | 3 | 4 | 3 | 5 |
| | | | | |

FIG. 4C
CURRENT NODE No.
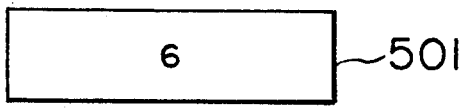
FIG. 4D
NEXT USE NODE No.
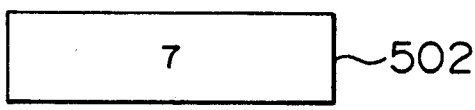
FIG. 4E
CURRENT BRANCH No.
FIG. 4F
| CASE No. | ASSIGNMENT SEQUENCE 504 | | | | |
|---|---|---|---|---|---|
| | 1 | 2 | 3 | 4 | ... |
| 1 | 2 | 5 | 4 | 3 | ... |
| 2 | 2 | 3 | 4 | 3 | ... |
| ⋮ | ⋮ | ⋮ | ⋮ | ⋮ | ... |

FIG. 5A

JOB DATA

| JOB No. | PRODUCT NAME | NUMBER OF PRODUCTS | POSSIBLE START TIME | DUE DATE | . . . |
|---|---|---|---|---|---|
| 1 | a | 100 | 0 | 10 | . . . |
| 2 | a | 50 | 0 | 10 | . . . |
| 3 | b | 100 | 5 | 10 | . . . |
| 4 | c | 50 | 5 | 15 | . . . |
| 5 | a | 100 | 5 | 15 | . . . |
| 6 | d | 50 | 5 | 15 | . . . |
| 7 | c | 100 | 5 | 20 | . . . |
| 8 | b | 50 | 10 | 20 | . . . |
| ⋮ | | | | | . . . |

FIG. 5B

RESOURCE DATA

| RESOURCE No. | DEVICE NAME | SERVICE START TIME | SERVICE END TIME | . . . |
|---|---|---|---|---|
| 1 | A | 5 | 20 | . . . |
| 2 | B | 0 | 20 | . . . |
| 3 | C | 0 | 24 | . . . |

FIG. 6

| NO. | CONDITION | APPLICATION STRATEGY No. |
|---|---|---|
| 1 | STATUS VALUE 1 >= 2 | 2 |
| 2 | STATUS VALUE 2 > 10 AND STATUS VALUE 3 ≦ 5 | 5 |
| 3 | STATUS VALUE 4 > 4 | 1 |
| ⋮ | | ⋮ |

SCHEDULE RESULT TABLE

| | RESOURCE No. | JOB No. | START TIME | END TIME | ... | ... |
|---|---|---|---|---|---|---|
| 1 | 2 | 1 | 17 | 20 | | |
| 2 | 1 | 2 | 5 | 8 | | |
| 3 | 3 | 5 | 12 | 16 | | |
| 4 | 1 | 3 | 1 | 3 | | |
| 5 | 0 | 0 | 0 | 0 | | |
| 6 | 3 | 3 | 5 | 9 | | |
| 7 | 1 | 1 | 11 | 16 | | |
| 8 | 2 | 5 | 4 | 10 | | |
| 9 | 0 | 0 | 0 | 0 | | |
| 10 | 0 | 0 | 0 | 0 | | |

FIG. 8A

EVALUATION VALUE TABLE 901

| EVALUATION ITEM / CASE No. | NUMBER OF NON-ASSIGNED JOBS | TOTAL SETUP TIME | ... | IMPROVEMENT EVALUATION ITEM |
|---|---|---|---|---|
| 1 | 30 | 300 | ... | NUMBER OF NON-ASSIGNED JOBS |
| 2 | 15 | 330 | ... | NUMBER OF NON-ASSIGNED JOBS |
| | | | | |

FIG. 8B

OPTIMUM CASE No. 902

| 2 |
|---|

FIG. 9A

EVALUATION VALUE IMPROVEMENT TABLE 1001

| NO. | EVALUATION ITEM | IMPROVEMENT PRECEDENCE | | | | |
|-----|-----------------|------------|------------|------------|------------|------------|
|     |                 | STRATEGY 1 | STRATEGY 2 | STRATEGY 3 | STRATEGY 4 | STRATEGY 5 |
| 1   | NUMBER OF NON-ASSIGNED JOBS | 0 | 2 | 1 | 3 | 0 |
| 2   | SETUP TIME      | 1 | 0 | 0 | 3 | 2 |
| 3 ⋮ |                 |   |   |   |   |   |

FIG. 9B

IMPROVEMENT EVALUATION ITEM

| NUMBER OF NON-ASSIGNED JOBS | 1002 |

$C_i$: CANDIDATE STRATEGY PRECEDENCE ON NODE $i$

FIG. 14

| NO. | CONDITION | IMPROVEMENT EVALUATION ITEM |
|---|---|---|
| 1 | FINAL STATUS VALUE 1 ≧ 10 | NUMBER OF NON-ASSIGNED JOBS |
| 2 | FINAL STATUS VALUE 1 < 0 AND FINAL STATUS VALUE 2 ≧ 200 | SETUP TIME |
| ... | ... | ... |

1303

METHOD FOR DETERMINING OPTIMUM SCHEDULE IN COMPUTER-AIDED SCHEDULING SYSTEM

BACKGROUND OF THE INVENTION

The present invention relates to a method for determining an optimum solution in a computer-aided scheduling system in various scheduling works.

An optimization technique in a scheduling problem is discussed, for example, in a book titled "INTERNATIONAL JOURNAL OF PRODUCTION RESEARCH", Volume 26, No. 5 (1988), pp. 821-844.

In this technique, an initial solution generated by a certain method is modified using a special algorithm to obtain another solution while satisfying constraints to thereby improve the evaluation value of the solution. According to the aforementioned algorithm for the modification, operations for an assignment method different from the resource assignment method used in generating the initial solution that cause resource competition are listed up to estimate an evaluation value, and if an improvement in the evaluation value can be expected, modification is made to the new assignment method.

This system is intended to solve a scheduling problem as a sort of search problem, that is, to apply operations backwardly from the goal to sequentially generate nodes and to thereby search a solution. In this case, in the above technique, its evaluation function includes a parameter indicative of a total value of processing times.

In the above technique, an evaluation function f* at each node n is considered to comprise two components of cost g* taken from a start node to node n and cost h* taken from node n to a target node, and a node providing a minimum of f* is selected for expansion. However, it is difficult to accurately calculate the evaluation function f* for estimating halfway the evaluation value of a solution at the time of completion of the scheduling process and the function cannot be often obtained during scheduling. Further, since solution searching is carried out by applying operations backwardly from the goal to sequentially generate nodes, the technique has a drawback that, in a practical scheduling problem, a lot of calculation time is required to find an optimal solution.

The technique also has another drawback that, in spite of the fact that it is necessary to consider several evaluation items in an actual problem, only one sort of evaluation item relating to a total processing time is taken into consideration and it is impossible to sequentially handle a plurality of evaluation functions.

SUMMARY OF THE INVENTION

It is therefore an object of the present invention to provide an optimum scheduling method which can eliminate the above problems in the prior art technique, and can improve a plurality of evaluation functions and can efficiently generate an optimum solution in various sorts of scheduling problems.

In accordance with the present invention, the above object is attained by providing a method for determining an optimum scheduling in a computer-aided scheduling system, wherein states in a scheduling process are defined as nodes, a new node indicative of a new state is generated by selecting and executing a scheduling strategy in the last node, and a search tree of nodes continuously connected in a chain is traced sequentially from an initial state to a scheduling completion state. The present method comprises the steps which follow. The data associated with a schedule to be generated is previously stored in a memory data. A strategy decision table showing therein one or more scheduling strategies suitable for a plurality of the states in a scheduling process is previously prepared and stored in the memory. An optimization definition table indicating degree of improvement precedence or precedence order of the scheduling strategies of the evaluation items, where degree of improvement precedence is defined as degree of improvement of evaluation value of the evaluation item in changing of the scheduling strategy, is previously prepared and stored in the memory. A schedule is generated by repeating of selecting and executing the scheduling strategies by using the strategy decision table. The other schedules are generated by changing the scheduling strategy selected in the state of the scheduling process by using the optimization definition table. The evaluation value of the generated schedules are calculated and stored in the memory. An optimum schedule having the best evaluation value is selected.

In accordance with the optimum schedule decision method of the present invention, the determination of a scheduling strategy and the execution of the scheduling strategy are repetitively carried out according to a scheduling situation in a solution generation step to generate an initial solution.

An evaluation value of the above-generated solution is calculated to select an optimum solution for the calculated evaluation value of the evaluation item to be improved among already-generated solutions in an evaluation step. A branch point for improving the evaluation value of the improvement evaluation item at high possibility is selected at a position as close to the initial state as possible to return the plan environment to that state during generation of the optimum solution in an optimization step. One of scheduling strategies different from that at the time of finding the optimum solution of the already-generated solutions is selected and executed. In this selection of strategy, a scheduling strategy having a high possibility of improving of the evaluation value is selected according to the improvement precedence. And thereafter the aforementioned solution generation step is executed to generate a new solution. The three steps are repeated as long as possible within an allowable time to sequentially improve the evaluation value of each evaluation item and thereby to generate the optimum solution. There are usually a plurality of evaluation items and during the execution of optimizing step, one of the evaluation items are specified and the optimization is made to this evaluation item.

According to the aforementioned method, a plurality of evaluation functions can be improved to efficiently generate an optimal solution in various sorts of scheduling problems.

BRIEF DESCRIPTION OF THE DRAWINGS

FIGS. 4A to 4F show an example of an arrangement of a schedule process trace table;

FIGS. 5A and 5B show a detailed example of an objective data table;

FIG. 6 shows an example of an arrangement of a strategy decision table;

FIG. 7 shows an example of an arrangement of a strategy decision table;

FIGS. 8A and 8B show an example of an arrangement of an evaluation table;

FIGS. 9A and 9B shows an example of an arrangement of an optimization method definition table;

FIG. 14 shows an example of an arrangement of an improvement evaluation item decision table.

DESCRIPTION OF THE PREFERRED EMBODIMENTS

Embodiments of the present invention will be explained by referring to the attached drawings.

Explanation will first be made as to a first embodiment of the present invention.

Figure 1:
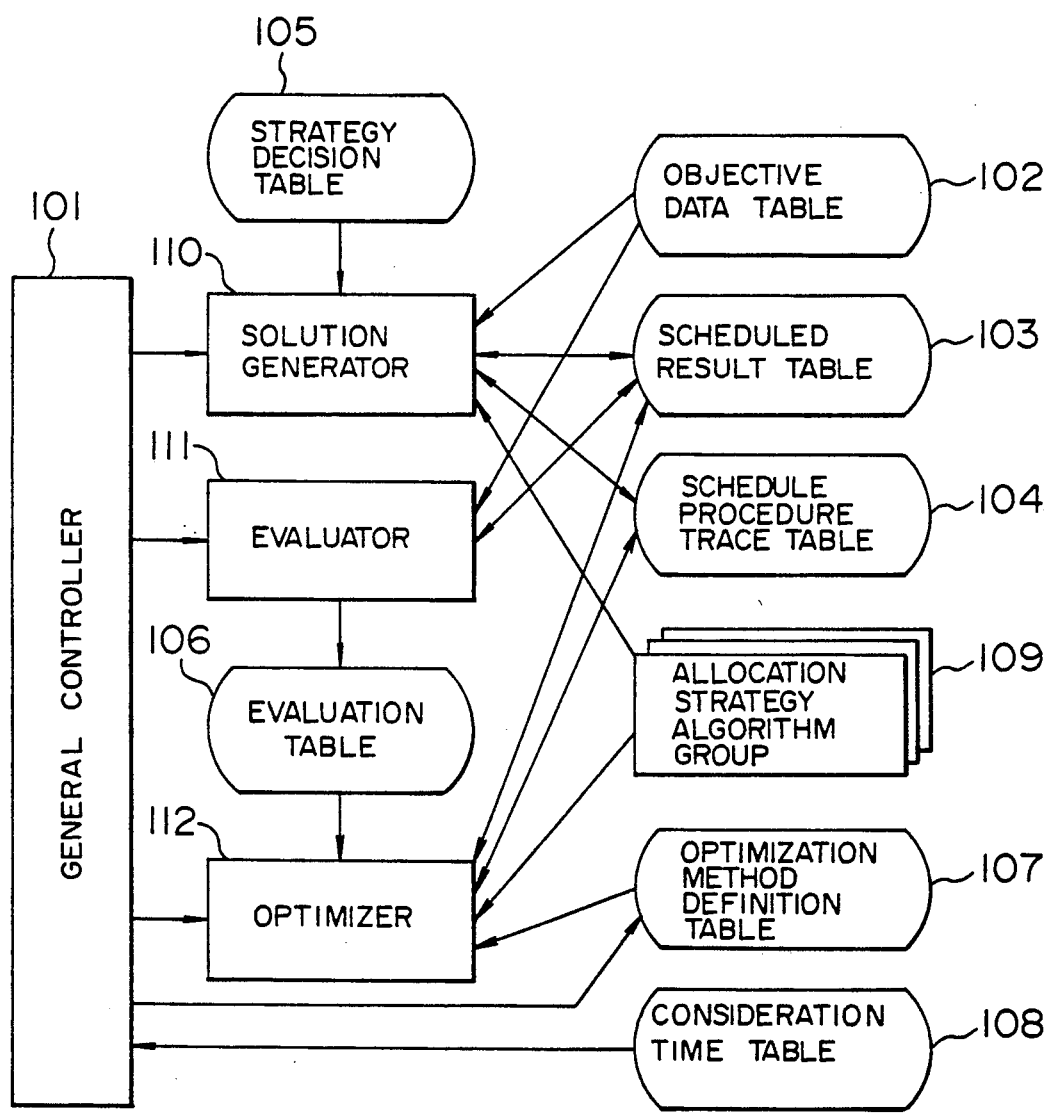
FIG. 1 shows relationships between functional blocks and tables in a computer-aided scheduling system in accordance with a first embodiment of the present invention.

Referring to FIG. 1, there is shown relationships between functional blocks and tables used in a computer-aided scheduling system in accordance with the first embodiment of the present invention. The details of the blocks and tables will be sequentially explained in connection with the other drawings.

The computer-aided scheduling system of the present embodiment includes a general controller 101, an object data table 102, a scheduled result table 103, a table 104 for tracing a schedule process (which will be referred merely as the schedule process trace table 104, hereinafter), a strategy decision table 105, an evaluation table 106, a table 107 for defining an optimization method (which will be referred to merely as the optimization method definition table 107), a consideration time table 108, a group 109 of assignment strategy algorithms, a solution generator 110, an evaluator 111 and an optimizer 112. The computer-aided scheduling system functions to generate an initial solution of a schedule and generate an optimum solution while improving the specified evaluation items.

The following explanation will be made in connection with, as an example, such a schedule management problem that processes (jobs) of a manufacturing lot for each product are to be assigned to which devices (resources) at what time, taking into consideration the due date of the product to be manufactured through a plurality of processing steps, the possible earliest start date and so on.

Figure 2:
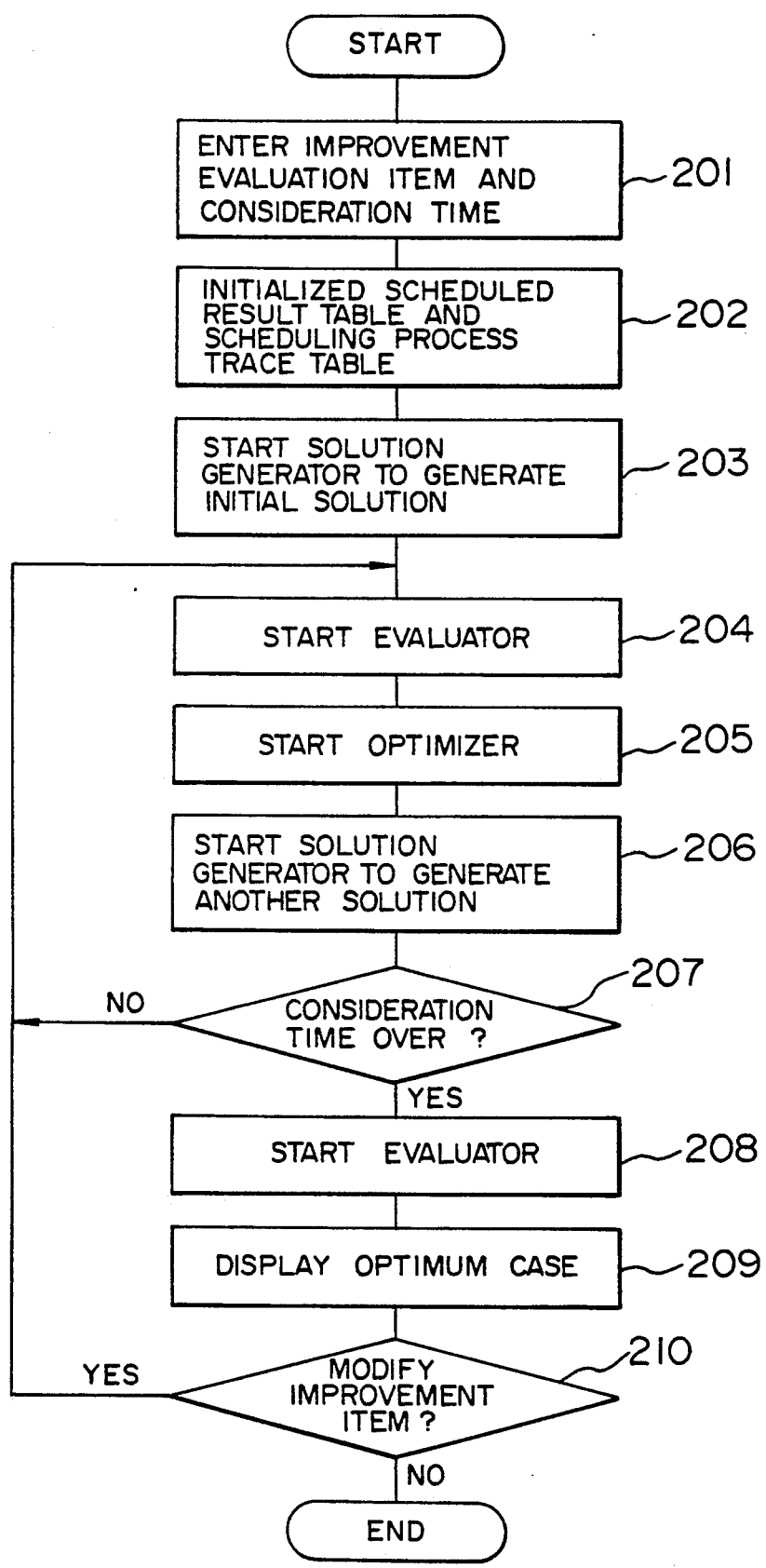
FIG. 2 is a flowchart for explaining the operation of a general controller in the computer-aided scheduling system.

Explanation will first be made as to the operation of the general controller 101 with reference to a flowchart of FIG. 2.

When the user of the system first enters an evaluation item to be improved and a consideration time (limit time) during which an optimum solution is to be created, the general controller 101 stores the entered evaluation item in the optimization method definition table 107 (which will be described later) as its improvement evaluation item. The general controller 101 also stores the aforementioned consideration limit time in the consideration time table 108 (step 201). The general controller 101 initializes the scheduled result table 103 and the schedule process trace table 104 and then activates the solution generator 110 to generate the initial solution of the schedule (steps 202 and 203).

The general controller 101 next activates the evaluator 111 which in turn calculates an evaluation value for each evaluation item with respect to the generated latest solution and selects one (best case) of the already generated solutions that is most suitable for the set improvement evaluation item (step 204). The general controller 101 then starts the optimizer 112 which in turn finds a position at which a scheduling strategy (assignment strategy) is modified as well as a new use strategy under the solution generation process of the aforementioned best case and backtracks the state to that position to modify to the above new assignment strategy (step 205). The general controller 101 starts the solution generator 110 which subsequently makes the remaining part of the schedule and generates another solution (step 206).

Thereafter, the general controller 101 judges whether or not to exceed the consideration time stored in the aforementioned consideration time table 108 (step 207). If not, then the general controller 101 returns to the processing of the step 204; while if so, then the controller 101 starts the evaluator 111 which in turn selects one (best case) of the already generated solutions most suitable for the set improvement evaluation item (step 208) and displays the best case (step 209). The general controller 101 then inquires of the user about a modification of the improvement item. If the user wants to modify the improvement item, then he or she again enters an evaluation item to be improved and a consideration time, which causes the general controller 101 to return to the processing of the step 204. No modification of the improvement item by the user results in that the processing is terminated (step 210).

The concept of the optimization in the present embodiment is as follows. In a solution generation process, when a transition is made from one state to the next one, candidate strategies and their application precedence are found from the strategy decision table 105 to execute the strategies in descending order of the precedence. That is, in the case where it is desired to improve an evaluation item. If one of the candidate strategies higher in improvement precedence than the use strategy exists under such a condition that is as close to the initial condition as possible, then such branch processing as to modify the current strategy to such candidate strategy is executed to generate another solution. This manner is shown in FIG. 10.

Figure 10:
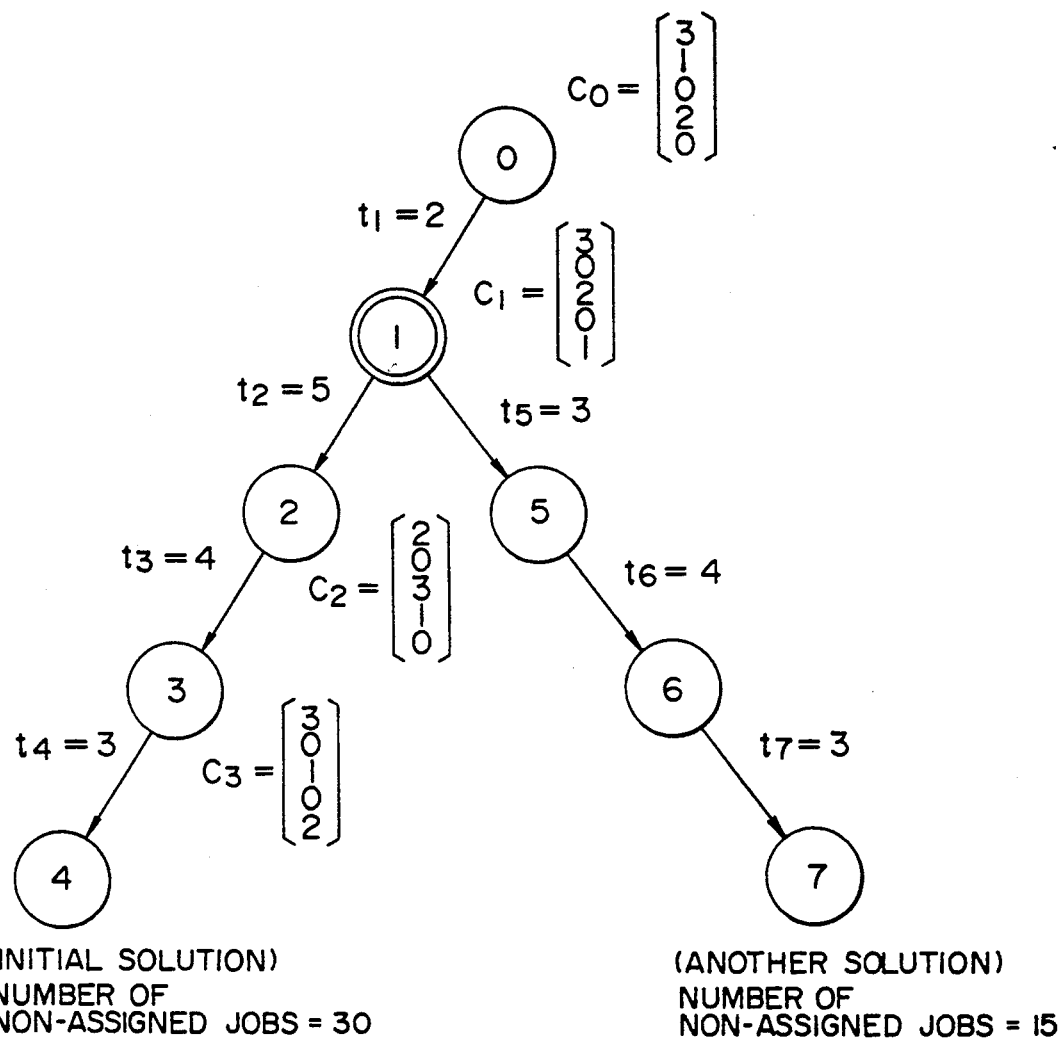
FIG. 10 is a diagram for explaining the concept of an optimizer.

In FIG. 10, symbol ○ denotes a node indicative of each of states in a solution generation process and a number in the symbol ○ denotes its node number. Further, symbol → denotes a branch, and symbol $t_k$ denotes a strategy number which is used when a transition is made from a node number (n) to another node number (n+1) with its suffix k representing its branch number. $C_i (i=1 \ldots 3)$ represent candidate strategy precedence on node i. In FIG. 10, node numbers are generated in the order of 0→2→3→4. When the node number is 4, the system is in the initial solution state. When it is desired to improve the initial solution, it is judged, at each of transition stages during transition of the node number in the order 0→2→3→4, whether or not there exists a candidate strategy higher in the improvement precedence than the use strategy and a branch is carried out as necessary.

The above operation will be sequentially detailed.

First, prior to explanation of the solution generator 110, the arrangement of the schedule process trace table 104 will be explained with reference to FIG. 4.

The schedule process trace table 104 comprises, as shown in FIGS. 4A to 4C, a state management table 401, a table 402 for management of data about developed branches (which will be referred to merely as the branch data management table 402, hereinafter), a current node number 501, a next use node number 502, a current branch number 503 and a table 504 having optimum solution generation results listed therein (which table will be referred to merely as the optimum solution result table 504, hereinafter).

Stored in the state management table 401 are candidate strategies and their application precedence, the numbers of developed branches, branch numbers and node numbers of the previous states, with respect to the states (nodes) of a scheduling process. In this connection, the developed branch numbers are stored in the developed order Stores in the branch data management table 402 are strategies used at the time of branch development, job numbers and resource numbers then assigned, and node numbers of their subsequent states, with respect to the states (nodes) of a scheduling process.

The current node number 501 stores therein a node number being now used in the scheduling process in the state management table 401. The next use node number 502 stores therein a node number to be next used in the scheduling process in the state management table 401. The current branch number 503 stores therein a branch number being now used in the branch data management table 402. The optimum-solution result table 504 stores therein sequences of the use strategy numbers with respect to the generated solutions in their generation order.

Figure 3:
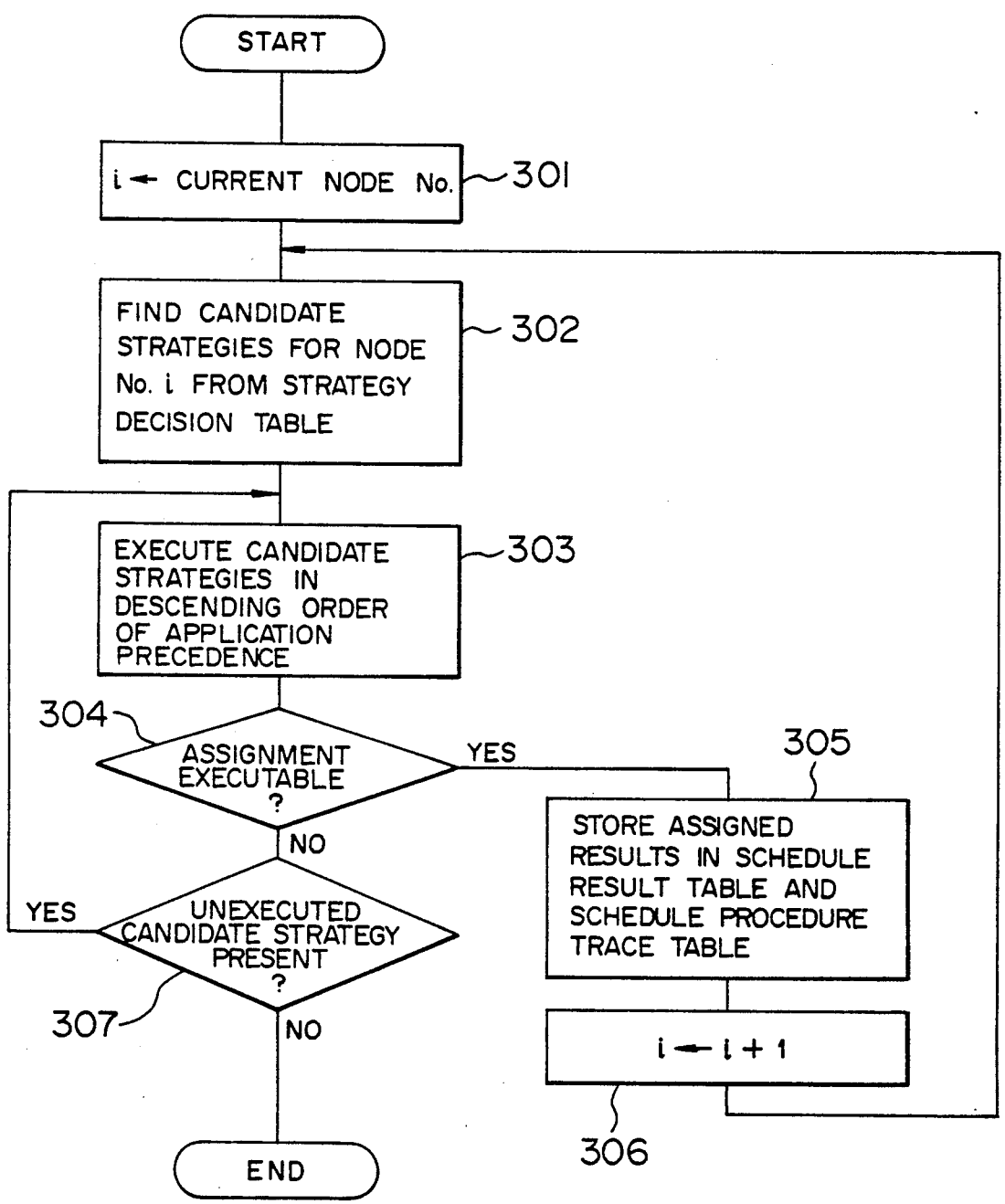
FIG. 3 is a flowchart for explaining the operation of a solution generator in the computer-aided scheduling system.

The operation of the solution generator 110 will be explained by referring to a flowchart of FIG. 3.

The solution generator 110, when activated by the general controller 101, first sets the current node number 502 at "i". The current node number 501 is set at "0" at the time of generating the initial solution in the step 203, while it is set at "4" at the time of generating another solution in the step 206 (step 301). Next, the solution generator 110 calculates a feature quantity for judgement of the schedule situation of jobs and resources on the basis of the data of the objective data table 102 and scheduled result table 103. The solution generator 110 sequentially compares the conditions of the strategy decision table 105 shown in FIG. 6 using the calculated feature value. When the condition is satisfied, the application precedence is sequentially numbered starting from 1 and the numbered application precedence is stored as the value of the strategy number corresponding to the above condition of the candidate strategy precedence of the node number i in the state management table 401 (step 302).

A specific example of the objective data table 102 is shown in FIG. 5. More specifically, FIG. 5(a) shows an example of job data associated with the schedule and FIG. 5(b) shows an example of resource (device) data associated with the schedule. Among the candidate strategy numbers corresponding to the node number i of the state management table 401, the solution generator 110 selects one strategy in a descending order of the precedence to execute one of the group of assignment strategy algorithms 109 for assignment of jobs to resources corresponding to the above strategy (step 303).

In a next step 304, the solution generation 110 judges whether or not the assignment execution in the step 303 has been successfully done. The judgement of the successful assignment execution causes a result of the assignment execution to be stored both in the scheduled result table 103 of FIG. 7 and in the schedule process trace table 104 of FIG. 4 (step 305). The current branch number 503, the next use node number 502 and the current branch number 503 are respectively counted up by "1" (step 306) and the solution generator 110 returns to the processing of the step 302. When it is determined that the assignment execution of the step 303 has been unsuccessful, it is judged whether or not the remaining candidate strategy not executed still exists (step 307). If so then the solution generator 110 returns to the processing of the step 303; while if not then the solution generator 110 terminates its processing.

Next, prior to explanation of the operation of the evaluator 111, the evaluation table 106 will be explained by referring to FIG. 8.

The evaluation table 106 comprises an evaluation value table 901 and an optimum case number 902. The case numbers of the evaluation value table 901 correspond to the case numbers of the optimum-solution result table 504. Stores in the evaluation value table 901 are evaluation values for respective evaluation items as well as improvement evaluation items then set, with respect to the solutions of the respective case numbers. Meanwhile stored in the optimum case number 902 is an optimum case number at which the improvement evaluation item is currently set.

The evaluator 111, when started by the general controller 101, receives the objective data table 102 and the scheduled result table 103 and calculates evaluation values for the respective evaluation items in accordance with a pre-prepared evaluation value calculation program. The calculated evaluation values are stored in the evaluation value table 901 together with the improvement evaluation items of the optimization method definition table 107 to be described later. Next, the evaluator 111 finds the optimum case number with respect to the improvement item and stores it in the optimum case number 902. The evaluator 111 reproduces the generation process of the solution of the optimum case number on the basis of the assignment sequences of the optimum-solution result table 504. A data on the reproduced solution generation process is stored in the state management table 401 and in the branch data management table 402.

Prior to explanation of the optimizer 112, the optimization method definition table 107 will next be explained by referring to FIG. 9. As shown in the drawing, the optimization method definition table 107 comprises an evaluation-value improvement table 1001 and an improvement evaluation item 1002. The evaluation-value improvement table 1001 is a table in which such experimental knowledge that respective strategies are effective to what extent with respect to the respective evaluation items in order to improve the evaluation items is expressed in the form of the precedence numbered sequentially from 1. In the example of FIG. 9, the order of application strategies effective in improving the evaluation item "number of non-assigned jobs" is strategy 3, strategy 2 and strategy 4. Stored in the improvement evaluation item 1002 is the evaluation item to be improved set by the user.

As already mentioned above, the concept of the optimization in the present embodiment is as follows. That is, when a transition is made from one state to the next one, candidate strategies and their application precedence are found from the strategy decision table 105 to execute the strategies in descending order of the precedence. In the case where it is desired to improve an evaluation item, if one of the candidate strategies higher in improvement precedence than the use strategy exists under such a condition that is as close to the initial condition as possible, then such branch processing as to modify the current strategy to such candidate strategy is executed to generate another solution utilizing the evaluation-value improvement table 1001. The above concept will be explained in more detail with use of the data of the state management table 401, branch data management table 402, evaluation-value improvement table 1001 and improvement evaluation item 1002.

In FIG. 10, node numbers are generated in the order of 0→2→3→4. When the node number is 4, the system is in the initial solution state. It will be seen from the evaluation-value improvement table 1001 that, of the strategies of the improvement evaluation item "number of non-assigned jobs", the strategies 3, 2 and 4 are higher in this order of the improvement precedence.

In the case where it is desired to improve the above initial solution with respect to the improvement evaluation item "number of non-assigned jobs", when a transition is first made from node 0 to node 1, the candidate strategies are the strategies 2, 4 and 5 and any strategy higher in improvement precedence than the use strategy 2 does not exist and thus the optimizer 112 checks the next node. When a transition is next made from node 1 to node 2, the candidate strategies are strategies 1, 3 and 5 and there exists the strategy 5 which is higher in improvement precedence than the use strategy 5, so that node number 1 is selected as a branch node. And the strategy 3 is selected as a new use strategy. Then, backtrack is carried out to the node number 1 to return the assignment state. The new use strategy 3 is executed and the state of the node 5 is established.

At the node 5 and subsequent nodes, assignment execution based on the strategy decision table 105 is repeated to generate a new solution. In the example of FIG. 10, the node 7 indicates a state in which a new solution (another solution) is found. The number of non-assigned jobs becomes 15, which means that a solution improved over the initial solution was obtained. When there does not exist any one of the candidate strategies which is higher in the improvement precedence than the use strategy under all the conditions, modification is effected to one of the candidates strategies next higher in the application precedence than the use strategy in a state as close to the initial state as possible to generate a new solution.

Figure 11:
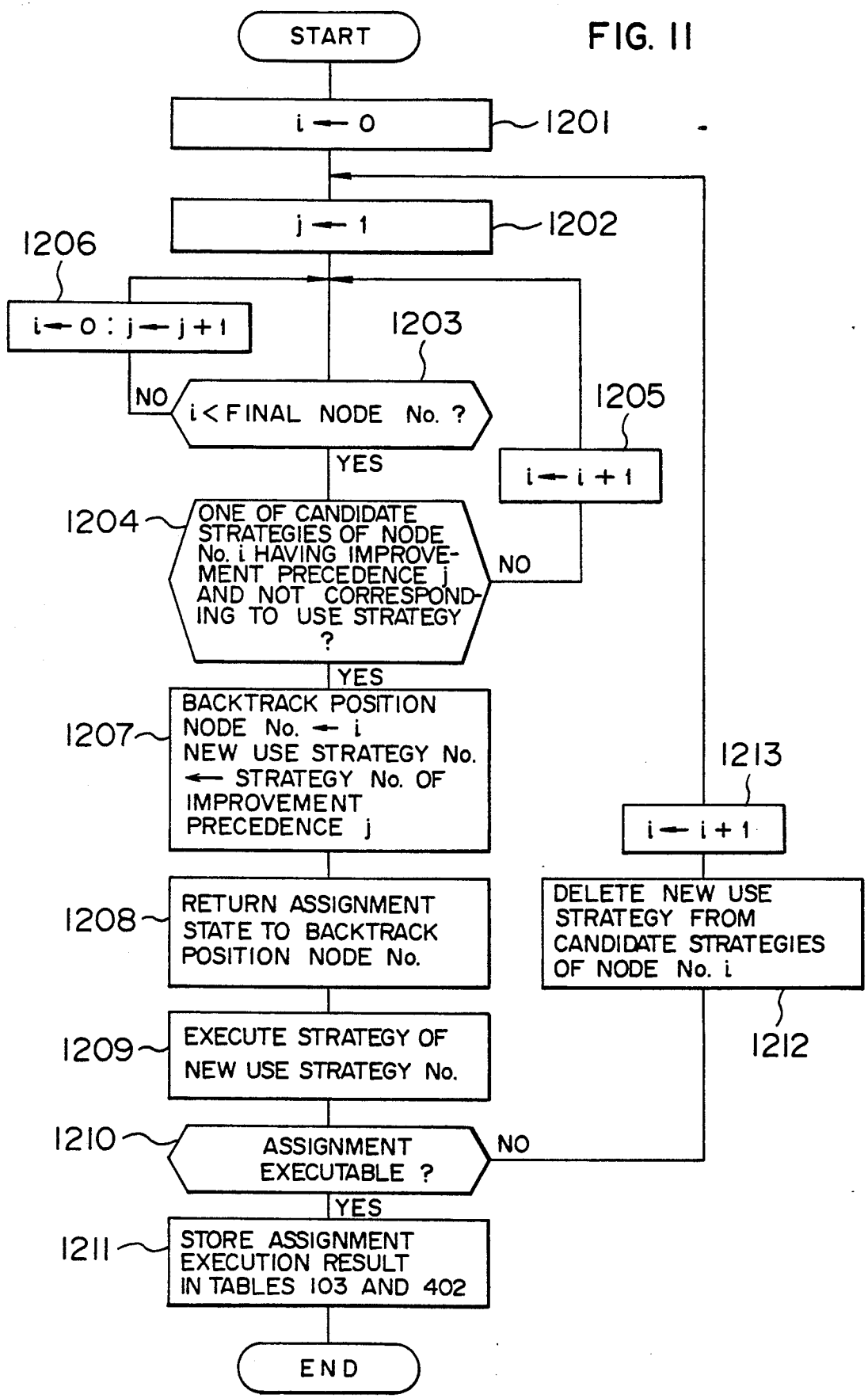
FIG. 11 is a flowchart for explaining the operation of the optimizer.

In the aforementioned processing, the optimizer 112 finds a position at which an assignment strategy suitable for improving the improvement evaluation item is modified as well as a new use strategy in the solution generation process of the optimum case. When backtrack is carried out down to the strategy modification position, execution is carried out until such branch processing as to modify it to the above new assignment strategy. The operation of the optimizer 112 will be explained in connection with a flowchart shown in FIG. 11.

The optimizer 112, when activated by the general controller 101, first sets "0" at the node i to be evaluated (step 1201). The optimizer 112 also sets "0" at the application precedence j of the candidate strategies at the optimum case node i (step 1202). Next, the optimizer 112 judges whether or not the node number i is the final node number of the optimum case (step 1203). The optimizer 112, when determining in the step 1203 that the node number i is not the final node number, judges, on the basis of the state management table 401, the branch data management table 402 and the evaluation-value improvement table 1001, whether or not one of the candidate strategies which has the improvement precedence j and which is not the use strategy exists in the node i of the optimum case (step 1204). If so(YES) then the optimizer 112 sets the node number i at the backtrack position node number and sets the strategy number of the candidate strategies having the improvement precedence j at the new use strategy number in a step 1207, after which further executes the processing of the next step 1208. The optimizer 112, when determining in the step 1204 that none of the candidate strategies which has the improvement precedence j and which is not the use strategy exists in the node i of the optimum case, counts up the number i by 1 (step 1205) and returns to the processing of the step 1203.

The optimizer 112, when determining in the step 1203 that the node number i is the final node number, resets the node number i at "0", counts up the number j by 1 (step 1206), and returns to the processing of the step 1203. In the step 1208, the optimizer 112 returns the assignment state to the state of the backtrack position node number. That is, the optimizer 112 deletes the assignment results of the scheduled result table 103 and optimum-solution result table 504 sequentially from the final node on the basis of the state management table 401 and the branch data management table 402. In the next step 1209, the optimizer 112 executes one of the allocation strategy algorithms 109 corresponding to the new use strategy number determined through the above processing in the state of the backtrack position node number.

After this, the optimizer 112 judges in a step 1210 whether or not the assignment execution has been successfully done. When determining the successful assignment execution, the optimizer 112 counts up the current node number 501, the next use node number 502 and the current branch number 503 respectively by 1, and then counts up by 1 the number of developed branches with respect to the backtrack position node number in the state management table 401 to add the current branch number 503 to the developed branch numbers. The optimizer 112 then stores a result of the above assignment execution in the scheduled result table 103 and in the branch data management table 402 at a position of the current branch number 503, and terminates its processing (step 1211). The determination of the impossible assignment execution in the step 1210 causes the optimizer 112 to delete the above new use strategy from the candidate strategies of the node number i in the state management table 401 (step 1212). The optimizer 112 then counts up the number i by 1 (step 1213) and returns to the processing of the step (1202).

The present embodiment is featured in that the user can generate the optimum solution desirable to the user while sequentially improving the evaluation item specified by the user based on the initial solution. In accordance with the present embodiment, since the user can set the consideration time, he or she can advantageously approach the optimum solution in the executable time. Further, since modification is made to a strategy for improving the specified evaluation item in a state as close to the initial state as possible in the determination of the backtrack position, another solution having improved the specified evaluation value can be advantageously generated efficiently.

Although explanation has been made in connection with the example wherein the determination of the backtrack position and the branch processing are carried out sequentially from the state as close to the initial state as possible in the foregoing embodiment, the above execution may be carried out reversely from the final state as another embodiment. In the latter case, another solution can be advantageously generated in a short time.

Figure 12:
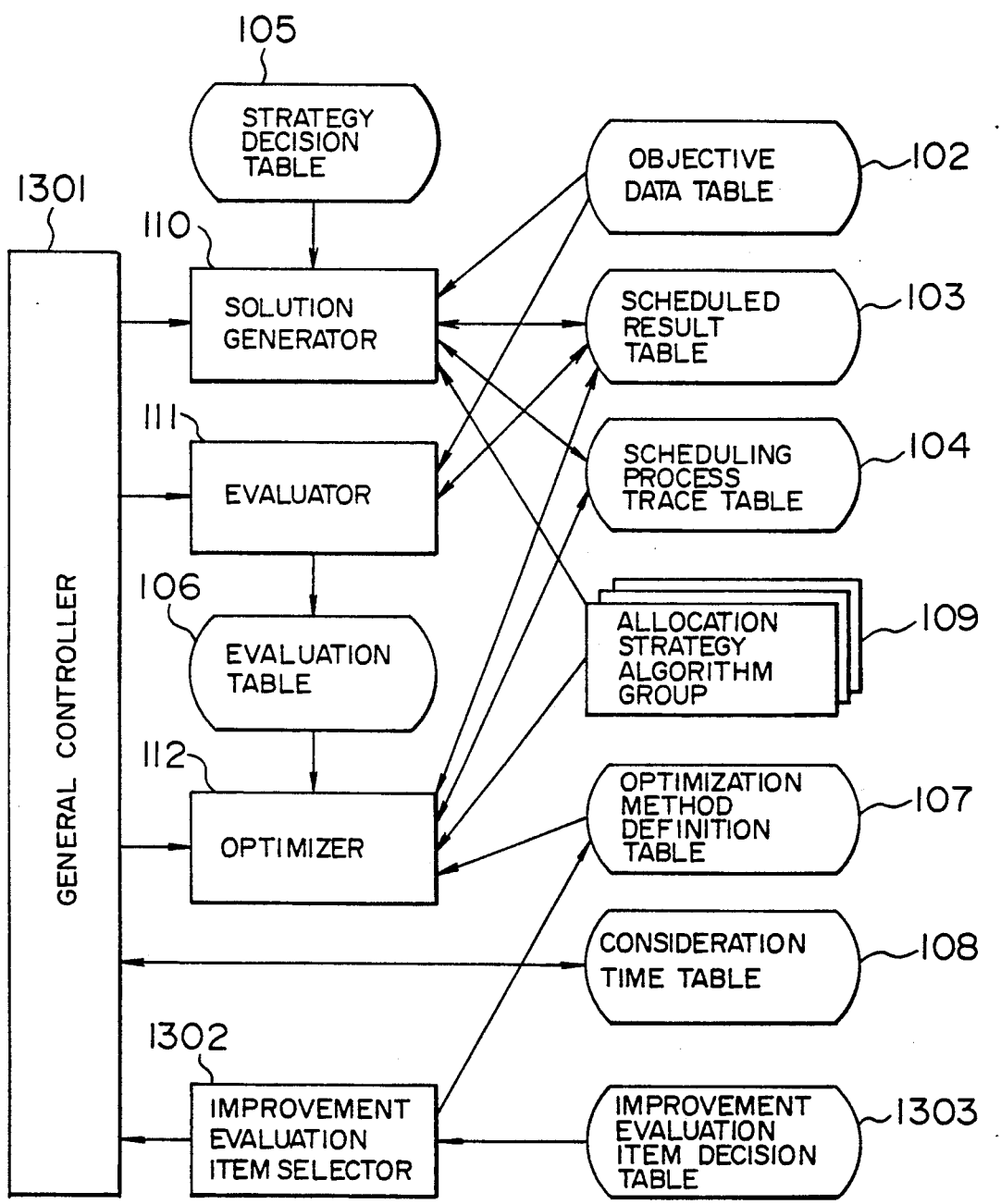
FIG. 12 shows relationships between functional blocks and tables in a computer-aided scheduling system in accordance with a second embodiment of the present invention.

Explanation will next be made as to a computer-aided scheduling system in accordance with a second embodiment of the present invention by referring to FIG. 12 showing relationships between functional blocks and tables. The present computer-aided scheduling system of the second embodiment is different from that of the first embodiment in that the second embodiment has newly a general controller 1301, a selector 1302 for selecting an evaluation item to be improved (which will be referred to as merely the evaluation item selector 1302, hereinafter) and a table 1302 for determining an evaluation item to be improved (which will be referred to as merely the evaluation item determination table 1303, hereinafter).

In more detail, the computer-aided scheduling system of the present embodiment includes the general controller 1301, the objective data table 102, the scheduled result table 103, the schedule process trace table 104, the strategy decision table 105, the evaluation table 106, the optimization method definition table 107, the consideration time table 108, the group 109 of allocation strategy algorithms, the solution generator 110, the evaluator 111, the optimizer 112, the evaluation item selector 1302 and the evaluation item determination table 1303. The present system generates an initial solution of a schedule and generate an optimum solution while improving a specified evaluation item on the basis of the initial solution. The objective data table 102, the scheduled result table 103, the schedule process trace table 104, the strategy decision table 105, the evaluation table 106, the optimization method definition table 107, the consideration time table 108, the group 109 of allocation strategy algorithms, the solution generator 110, the evaluator 111 and the optimizer 112 are substantially the same in contents as the corresponding ones of the first embodiment.

Figure 13:
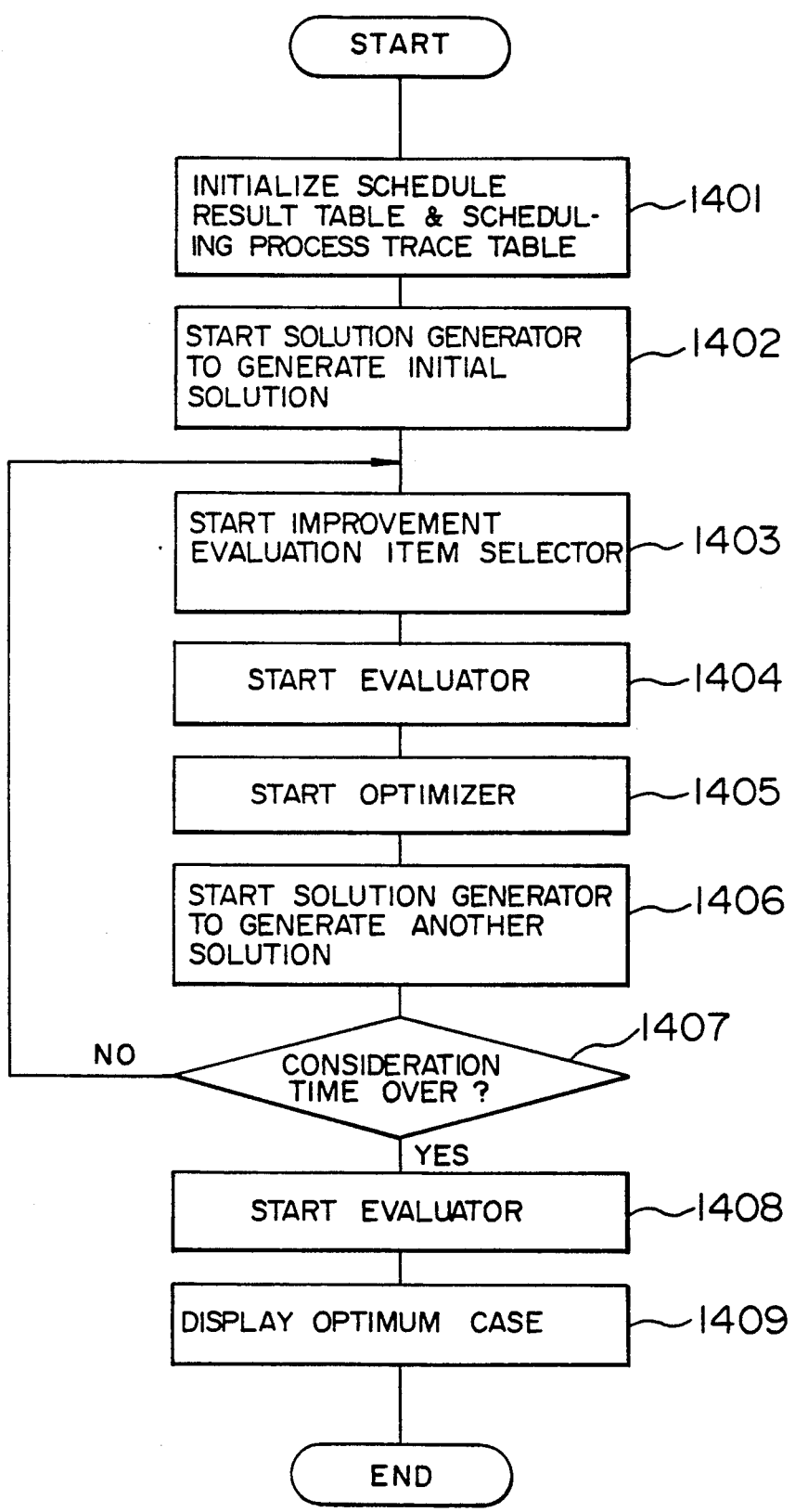
FIG. 13 is a flowchart for explaining the operation of a general controller in the computer-aided scheduling system of the second embodiment.

The operation of the general controller 1301 will be explained with reference to a flowchart of FIG. 13.

The user first enters a consideration time necessary for generating an optimum solution. This causes the general controller 1301 to store the consideration time in the consideration time table 108. The general controller 1301 initializes the scheduled result table 103 and the schedule process trace table 104 (step 1401) and then activates the solution generator 110 to generate an initial solution (step 1402). The general controller 1301 next activates the evaluation item selector 1302 to select an evaluation item to be improved (step 1403).

Next, the general controller 1301 operates the evaluator 111 which in turn computes evaluation values for the respective evaluation items with respect to the latest solution generated. The evaluator 111 selects an optimum case for the selected improvement evaluation item from already generated solutions (step 1404).

Thereafter, the general controller 1301 activates the optimizer 112, which in turn finds a strategy modification position and a new use strategy in the solution generation process of the above optimum case and backtracks the current position to the found strategy modification position to modify it to the above new allocation strategy (step 1405). Then, the general controller 1301 activates the solution generator 110. The solution 110 generates another solution (step 1406).

The general controller 1301 judges whether or not a processing time taken from the start to the step 1406 of generating another solution exceeds the consideration time stored in the consideration limit time table 108 (step 1407). The determination of the processing time not exceeding the consideration limit time causes the general controller 1301 to return to the processing of the step 1403. The determination of the processing time exceeding the consideration limit time causes the general controller 1301 to activate the evaluator 111. The evaluator 111 selects the optimum case for the selected improvement evaluation item from the already generated solutions (step 1408), displays the optimum case and terminates its processing (step 1409).

Prior to explanation of the evaluation item selector 1302, explanation will first be made as to the arrangement of the evaluation item determination table 1303. The evaluation item determination table 1303 is used to determine en evaluation item to be improved on the basis of a computable quantity (solution feature quantity) indicative of a feature of the latest solution The evaluation item determination table 1303 comprises conditions and improvement evaluation items to be desirably selected when the conditions are satisfied.

The evaluation item selector 1302, when activated by the general controller 1301, calculates a solution feature quantity in accordance with a pre-prepared program of solution feature calculation, judges whether or not the conditions in the evaluation item determination table 1303 are satisfied with respect to the calculated solution feature value, and sets the improvement evaluation item corresponding to the first satisfied condition in the improvement evaluation item 1002 (refer to FIG. 9).

The second embodiment of the present invention is characterized in that an evaluation item to be improved with a high possibility can be automatically selected according to the solution generated based on the initial solution and the selected evaluation item can be sequentially improved, whereby the optimum solution as a whole can be automatically generated.

Though the determination of the evaluation value to be improved has been made utilizing the evaluation item determination table 1303 in the second embodiment, the evaluation items may also be sequentially improved from the evaluation item number 1 in the evaluation-value improvement table 1001 (refer to FIG. 9). In the latter case, the evaluation item determination table 1303 becomes unnecessary.

As has been disclosed in the foregoing in accordance with the present invention, the determination of a scheduling strategy and the execution of the scheduling strategy are repetitively carried out according to a schedule situation in a solution generation step to generate an initial solution, an evaluation value of the above-generated latest solution is calculated to select an optimum solution for the calculated evaluation value of the evaluation item to be improved from already-generated solutions in an evaluation step, a branch for improving the evaluation value of the improvement evaluation item at high possibility is selected at a position as close to the initial state as possible to return the schedule situation to that state during generation of the optimum solution in an optimization step, one of scheduling strategies which has a high possibility of improving another evaluation value different from that at the time of finding the optimum solution of the already-generated solutions is executed, and thereafter the aforementioned solution generation step is executed to generate a new solution. Since such processing is repeated as long as possible within an allowable time to sequentially improve the evaluation value of each evaluation item and thereby to generate the optimum solution, there can be realized a computer-aided scheduling system which can improve a plurality of evaluation functions and can efficiently generate an optimum solution in various sorts of scheduling problems.

What is claimed is:

1. A method for determining an optimum scheduling in a computer-aided scheduling system, wherein states in a scheduling process are defined as nodes, a new node indicative of a new state is generated by selecting and executing a scheduling strategy in a last node, and a search tree of nodes continuously connected in a chain is traced sequentially from an initial state to a scheduling completion state, said method comprising the steps of:

previously storing in a memory data associated with a schedule to be generated;

previously preparing a strategy decision table showing therein one or more scheduling strategies suitable for a plurality of said states in a scheduling process, said strategy decision table being stored in the memory;

previously preparing and storing, in the memory, an optimization definition table indicating a degree of improvement precedence or precedence order of the scheduling strategies of evaluation times, said degree of improvement precedence being defined as degree of improvement of evaluation value of the evaluation item in changing the scheduling strategy;

generating a schedule by repeating of selecting and executing said scheduling strategies by using said strategy decision table;

generating other schedules by changing the scheduling strategy selected in the states of the scheduling process by using said optimization definition table wherein a branch node of the state of the scheduling process, where the scheduling strategy is changed, is searched from the node which is nearest to the initial state, and the scheduling strategy in the node is changed in a manner that a degree of improvement of the evaluation value of the evaluation item becomes greater than that in the executed scheduling strategy;

calculating the evaluation value of the generated schedules and storing said evaluation value in the memory; and, selecting an optimum schedule having a best evaluation value.

2. The method as set forth in claim 1, further comprising a step of setting or modifying said evaluation item to be improved by an operator.

3. The method as set forth in claim 1, further comprising a step of setting a processing limit time to be taken from said initial state to said optimum schedule by the operator, and wherein the optimum schedule is generated in said processing limit time.

4. The method as set forth in claim 1, further comprising a selection step of previously preparing rules for determining said evaluation item to be improved on the basis of said stored schedule results and previously storing said rules in said memory, and determining said evaluation item to be improved on the basis of said stored data of the schedule and said schedule results already stored and stored in said memory and said rules.

5. The method as set forth in claim 4, further comprising a step of setting a processing limit time to be taken from said initial state to said optimum schedule by the operator, and wherein the optimum schedule is generated in said processing limit time.

6. A method for determining an optimum scheduling in a computer-aided scheduling system, wherein states in a scheduling process are defined as nodes, a new node indicative of a new state is generated by selecting and executing a scheduling strategy in a last node, and a search tree of nodes continuously connected in a chain is traced sequentially from an initial state to a scheduling completion state, said method comprising the steps of:

previously storing in a memory data associated with a schedule to be generated;

previously preparing a strategy decision table showing therein one or more scheduling strategies suitable for a plurality of said states in a scheduling process, said strategy decision table being stored in the memory;

previously preparing and storing, in the memory, an optimization definition table indicating a degree of improvement precedence or precedence order of the scheduling strategies of evaluation times, said degree of improvement precedence being defined as degree of improvement of evaluation value of the evaluation item in changing the scheduling strategy;

generating a schedule by repeating of selecting and executing said scheduling strategies by using said strategy decision table;

generating other schedules by changing the scheduling strategy selected in the states of the scheduling process by using said optimization definition table, including judging as to whether the scheduling strategy having a higher degree of improvement precedence than that of the executed scheduling strategy while adapting to the scheduling strategies of each of the nodes exists or not, and changing the scheduling strategy of a one of the nodes having the highest degree of improvement precedence among them;

calculating the evaluation value of the generated schedules and storing said evaluation value in the memory; and, selecting an optimum schedule having a best evaluation value.

7. The method as set forth in claim 6, further comprising a step of setting or modifying said evaluation item to be improved by an operator.

8. The method as set forth in claim 6, further comprising a step of setting a processing limit time to be taken from said initial state to said optimum schedule by the operator, and wherein the optimum schedule is generated in said processing limit time.

9. The method as set forth in claim 6, further comprising a selection step of previously preparing rules for determining said evaluation item to be improved on the basis of said stored schedule results and previously storing said rules in said memory, and determining said evaluation item to be improved on the basis of said stored data of the schedule and said schedule results already stored and stored in said memory and said rules.

10. The method as set forth in claim 9, further comprising a step of setting a processing limit time to be taken from said initial state to said optimum schedule by the operator, and wherein the optimum schedule is generated in said processing limit time.

* * * * *